UNITED STATES PATENT OFFICE 2,473,111

PROCESS FOR PRODUCTION OF 2-AMINO PYRIMIDINES AND 2-AMINO GLYOXALINES

Wallace Frank Short and Peter Oxley, Nottingham, England, assignors to Boots Pure Drug Company Limited, Nottingham, England, a company of Great Britain No Drawing. Application June 3, 1946, Serial No. 674,032. In Great Britain June 19, 1945

8 Claims. (Cl. 260—251)

This invention relates to the production of salts of heterocyclic compounds containing the grouping $-N=C(NH_2)-NH-$. These salts are useful as intermediates in the preparation of compounds of pharmacological importance.

According to the invention, salts of heterocyclic compounds containing the aforesaid grouping are obtained by reacting dicyandiamide with a mono acid salt of a diamine of the formula

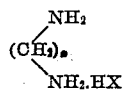

where HX is the acid used to form the salt and $x$ is an integer selected from the group consisting of 2 and 3.

The heterocyclic compounds of which the salts are formed are, therefore, represented by a ring system having the formula

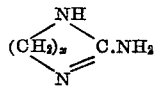

$x$ having the significance stated. When $x$ is 2 the product will be 2-amino-4:5-dihydroglyoxaline and when $x$ is 3 the product is a substituted tetrahydropyrimidine.

Instead of a mono acid salt of the diamine (either preformed or made in situ) the di-acid salt may be used, in which case, a guanidine salt

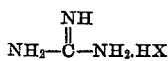

is also formed, and this is no doubt due to the reaction between unreacted dicyandiamide and the ammonium salt formed in the ring closure.

In order that the invention may be easily understood and readily carried into effect, the following examples are given, but the invention is not limited thereto.

Example 1

In the preparation of 2-amino-4:5-dihydroglyoxaline toluene-p-sulphonate, a mixture of 2.1 g. of dicyandiamide and 11.6 g. of ethylenediamine mono-toluene-p-sulphonate is heated at a temperature of 140° C. for 2¼ hours. During heating ammonia is evolved. After cooling the product is crystallised from alcohol whereupon 2-amino - 4:5 - dihydroglyoxaline toluene-p-sulphonate is obtained in the form of crystals having a melting point of 166–167° C. (found N,16.6%; $C_{10}H_{15}O_3N_3S$ requires N, 16.3%).

Example 2

In the preparation of 2-amino-4:5-dihydroglyoxaline toluene-p-sulphonate, a mixture of 8.4 g. of dicyandiamide and 40.4 g. of ethylenediamine di-toluene-p-sulphonate is heated at a temperature of 220° C. for 20 minutes. After cooling, the product is dissolved in 250 cc. of hot water. On cooling the solution guanidine toluene-p-sulphonate separates in the form of crystals and is filtered off. The aqueous motherliquor is evaporated to dryness and the residue is crystallised from methyl alcohol whereupon 2-amino - 4:5 - dihydroglyoxaline toluene-p-sulphonate separates in the form of crystals having a melting point of 166° C.

Example 3

In the preparation of 2-amino-3:4:5:6-tetrahydropyrimidine toluene-p-sulphonate, a mixture of 2.1 g. of dicyandiamide, 1.85 g. of trimethylenediamine and 10.45 g. of trimethylenediamine di-toluene-p-sulphonate is heated at a temperature of 160–165° C. for 3 hours. After cooling, the product is crystallised from isopropyl alcohol whereupon 2-amino-3:4:5:6-tetrahydropyrimidine toluene-p-sulphonate is obtained in the form of crystals having a melting point of 174° (found: N, 15.5%; $C_{11}H_{17}O_3N_3S$ requires N, 15.5%).

We claim:

1. A process for the production of salts of heterocyclic compounds represented by the ring system

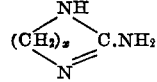

which comprises the steps of reacting dicyandiamide with a salt of a diamine of the formula

where $x$ is an integer selected from the group consisting of 2 and 3 and recovering the heterocyclic compound formed by the reaction.

2. A process for the production of salts of heterocyclic compounds represented by the ring system

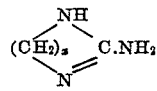

which comprises the steps of reacting dicyandiamide with a mono acid salt of a diamine of the formula

and recovering the heterocyclic compound formed by the reaction, $x$ being an integer selected from the group consisting of 2 and 3.

3. A process for the production of salts of heterocyclic compounds represented by the ring system

which comprises the steps of reacting dicyandiamide with a di-acid salt of a diamine of the formula

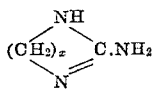

and recovering the heterocyclic compound formed by the reaction, $x$ being an integer selected from the group consisting of 2 and 3.

4. A process as claimed in claim 1, in which the acid used to form the salt is toluene-p-sulphonic acid.

5. A process for the production of a salt of a heterocyclic compound represented by the ring system

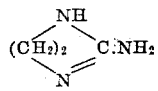

which comprises the steps of reacting dicyandiamide with a salt of ethylene diamine and recovering the heterocyclic compound formed by the reaction.

6. A process for the production of a salt of a heterocyclic compound represented by the ring system

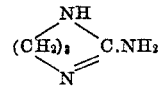

which comprises the steps of reacting dicyandiamide with a salt of trimethylene diamine and recovering the heterocyclic compound formed by the reaction.

7. A process for the production of a toluene-p-sulphonate salt of a heterocyclic compound represented by the ring system

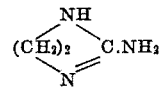

which comprises the steps of reacting dicyandiamide with ethylene diamine toluene-p-sulphonate and recovering the heterocyclic compound formed by the reaction.

8. A process for the production of a toluene-p-sulphonate salt of a heterocyclic compound represented by the ring system

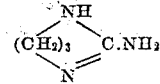

which comprises the steps of reacting dicyandiamide with trimethylene diamine toluene-p-sulphonate and recovering the heterocyclic compound formed by the reaction.

WALLACE FRANK SHORT.
PETER OXLEY.

No references cited.